G. E. TOMLINSON.
FLEXIBLE COUPLING.
APPLICATION FILED OCT. 18, 1919.
1,353,677. Patented Sept. 21, 1920.
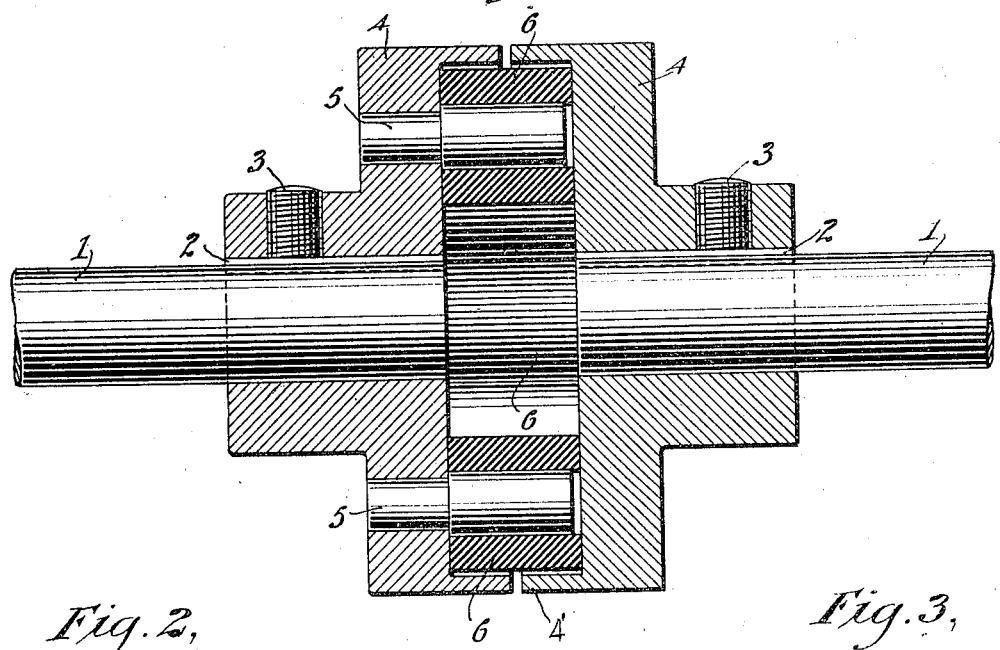
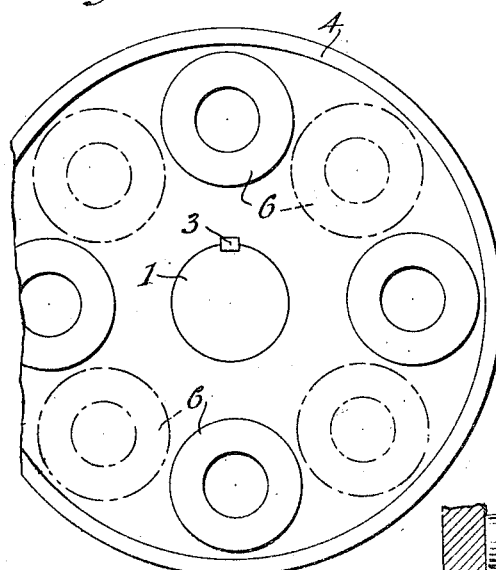
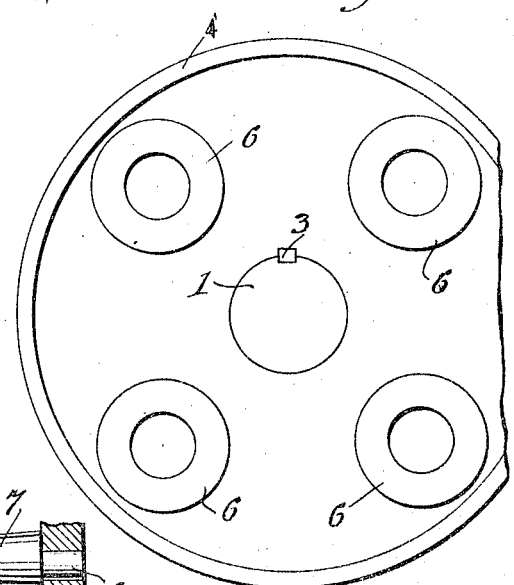
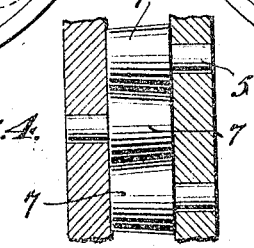
WITNESSES
Edw. Thorpe
INVENTOR
George E. Tomlinson
BY
ATTORNEYS

UNITED STATES PATENT OFFICE.

GEORGE EDWARD TOMLINSON, OF WINCHESTER, KENTUCKY.

FLEXIBLE COUPLING.

1,353,677.

Specification of Letters Patent.

Patented Sept. 21, 1920.

Application filed October 18, 1919. Serial No. 331,571.

*To whom it may concern:*

Be it known that I, GEORGE E. TOMLINSON, a citizen of the United States, and a resident of Winchester, in the county of Clark and State of Kentucky, have invented a new and Improved Flexible Coupling, of which the following is a full, clear, and exact description.

It is a well-known fact that the flexible couplings or universal joints commonly employed in connection with the driving shaft of an engine have proven unsatisfactory, due to the fact that after being used for a time a certain amount of looseness, commonly termed "play," is set up, which rapidly becomes more apparent with use and usually results in the breakage of a joint.

At best, universal joints or flexible couplings have heretofore proven very unsatisfactory in view of the fact that they must be packed with lubricant after having operated for a certain length of time, which in itself is not an agreeable operation, and if this lubricating is not resorted to rapid wear sets in, which commonly results in the breaking of the vital parts of the joint.

Further, universal joints or flexible couplings after having been used for a time always have a certain amount of play or looseness, which is likely to result in the snapping of the joint, together with a continual strain under varying speeds of the driving plant, where a clutch is interposed between the joint and the driving plant.

With the above in mind I have constructed a flexible coupling which may be employed in conjunction with any type of power-driven shaft where the driven shaft extends at a fixed or varying angle to the driving shaft, which coupling will require no attention whatsoever, such as oiling, wherein the wear will be reduced to a minimum, which will be capable of absorbing shocks to a certain extent, and wherein any number of disadvantages experienced in connection with flexible couplings or universal joints is eliminated.

This invention, although providing a flexible coupling which may be used in connection with any type of shaft, is particularly intended for use in connection with a driving energy the power from which is to be transmitted directly to mandrels or shafts, and for locking purposes.

A further object of the invention is the provision of a coupling which shall embody the maximum of safety in its construction, so that any danger of breakage may be reduced to a minimum.

Reference is had to the attached sheet of drawings which illustrate two practical embodiments of my invention and in which—

Figure 1 is a sectional side view through my coupling;

Fig. 2 represents one-half of the coupling with the position of the essential elements of the second half indicated in dotted lines;

Fig. 3 illustrates the second half; and

Fig. 4 is a reduced view similar to Fig. 1, disclosing a slightly modified form of coupling.

In all of these views like reference numerals designate similar parts, and the reference numeral 1 indicates the driving and driven shafts, the power of one of which is to be imparted to the other.

Secured by any convenient means, such as a key 2 and set screw 3, to the shafts 1 are a pair of casings 4 having one of their faces open and facing one another. Reference being had to Fig. 1, it will be seen that each of the casings 4 is provided with a flange 4', which extends one-half the distance of the space separating the two halves, so that the flexible elements are enveloped as completely as possible, for the purpose hereinafter more fully specified.

Associated with the interior of the casings 4 are studs 5 which may be secured thereto in any convenient manner, although preferably they extend, as indicated in Fig. 1, through their respective casings and are expanded within the openings through which their shanks extend in such a manner as to entirely eliminate any danger of their becoming loosened.

Extending around each of the studs 5 is a cylindrical member 6 constructed of any resilient material, such as rubber, leather, fiber fabric, etc., it being noted that the upper edges of such members extend slightly beyond the upper faces of the studs 5. Each of the casings 4 may be provided with any suitable number of these studs and resilient members, but I conveniently provide each of the casings with four spaced studs, the vacancy between each stud being adapted to be filled by a stud and associated resilient member from the opposing casing, as has been indicated in Fig. 2.

It will thus be seen that by virtue of the construction illustrated it will be possible for me to vary the driving shaft with respect to the driven shaft through any reasonable arc, and yet have a perfect transmission of power from one shaft to the other by means of my coupling, which movement is permitted by virtue of the spacing of the inner edge of one casing 4 from that of the opposing casing.

From the foregoing it will be appreciated that I have constructed a coupling which will require no attention whatsoever, which will serve to absorb to a certain extent any sudden shocks imparted from one shaft to the other, and in which there will be a minimum of wear only. Further, instead of the wear appearing upon metallic parts, which is the case with the present type of couplings, resulting in their having to be discarded, it will be seen that it will only be necessary when my coupling becomes worn to renew the cylindrical members 6, which will result in a tight fit and renewed efficiency of operation.

Referring now more particularly to Fig. 4, it will be seen that the coupling illustrated in this figure differs in no major respect from that illustrated in Figs. 1, 2 and 3 with the exception that the members 6 in this instance have been formed with slightly tapered sides, which results in what might be termed a "wedge fit," resulting in a tighter engagement of the parts of the coupling as the two casings are drawn together. From the above it will be seen that I have constructed a coupling which accomplishes all of the objects set forth in the preamble to the specification and that by virtue of the flanges 4', associated with each of the casings 4, extending over one-half of the distance of the space separating the two halves, the flexible elements are inclosed as completely as possible, which serves as a protection for these elements as well as to the operator of the machine.

I claim:

1. A flexible coupling, including a pair of supporting members, studs projecting from one of the faces of each of such supporting members, and resilient means adapted to be associated with each of such studs, the resilient means associated with one of such members being adapted to engage with the resilient means associated with the opposite member.

2. A flexible coupling, including a pair of supporting members, studs projecting from one of the faces of each of such supporting members, and cylindrical members enveloping each of such studs and being adapted to engage the side walls of the cylindrical members associated with the second member.

3. A flexible coupling, including a pair of supporting members, supporting means projecting from one of the faces of each of said supporting members, and resilient means adapted to envelop each of said supporting members, the resilient means associated with one of such members being adapted to engage the resilient means associated with the opposite member.

GEORGE EDWARD TOMLINSON.